United States Patent Office 2,825,708
Patented Mar. 4, 1958

2,825,708

PROCESS IN MAKING OIL-IN-WATER RESIN EMULSION PIGMENT PRINTING COLORS

Laszlo Auer, South Orange, N. J., assignor to J. R. Geigy, S. A., Basel, Switzerland, a corporation of Switzerland No Drawing. Application May 4, 1953
Serial No. 352,958

24 Claims. (Cl. 260—22)

The general drawback of pigment printing colors on textiles is their crocking. Crocking is marking off by abrasion to an unprinted and not dyed portion of the fabric, or to fabric in general. The crocking of pigment colors is their main drawback, which prevents increase in their use for coloring textiles. Also, the washability and dry cleaning resistance of pigment colored fabrics requires improvement, particularly if high temperatures of "curing" is to be avoided. Textile plants have low pressure steam available and for curing or thermosetting the amino-aldehyde resins temperatures of 275° to 300° F. are needed.

In present day textile printing with pigments water-in-oil emulsions are used to a great extent in the trade, in spite of the fact that solvent cleaning of equipment is troublesome in textile plants.

Oil-in-water emulsions are easier to handle in textile plants than water-in-oil emulsions. They could be washed from the printing rollers, color boxes, doctor blades, brush rollers, etc. with water. They also could be washed from backgrays, rubber blankets with ease. There are two reasons why there was no oil-in-water type printing color on the market prior to the instant development: (1) Emulsifying agents which are suitable to produce oil-in-water emulsions and the necessary protective colloids, which secure stability, both reduce the washability of pigment prints. Present day binders do not take such reduction successfully. (2) If the same quantity of pigment color is dispersed in an oil-in-water emulsion color concentrate and in a water-in-oil concentrate, and both are reduced in varying proportions with clear cut-back emulsions, the water-in-oil emulsion printing colors take more reduction to yield a certain shade, than oil-in-water emulsions. The reason is probably explained by the fact that most pigments are hydrophobic and organophilic, flush into the oil phase, and if the color bearing oil phase is the continuous phase of the emulsion, better mileage is obtained, pound for pound for colors. As the pigment colors are the most expensive ingredient of printing emulsion colors, economic factors excluded up to now the use of oil-in-water emulsions for printing, whereas they are used regularly for pigment padding, to obtain solid shades.

In my co-pending applications Serial #91,009 filed May 2, 1949, now United States Patent No. 2,637,621, issued May 5, 1953, and Serial #196,724 filed November 20, 1950, now United States Patent No. 2,681,322, issued June 15, 1954, various improvements are described relating to improved oil-in-water resin emulsion pigment printing colors, particularly with regard to selected resin binders and compositions which show advantages in the art. In my co-pending application Serial #169,791 filed June 22, 1950, now United States Patent No. 2,637,711, issued May 5, 1953, a special composition is described, which shows improvements and advantages in the art of oil-in-water resin emulsion pigment printing. In my co-pending application Serial #180,700, filed August 21, 1950, now United States Patent No. 2,637,705, issued May 5, 1953, improvements are described in the extender pastes and in oil-in-water resin emulsion pigment printing. The instant case is a continuation in part of my said co-pending applications Serial #91,009, #196,724, #169,791 and #180,700, now Patent Nos. 2,637,621, 2,681,322, 2,637,711 and 2,637,705, respectively.

In accordance with this invention, improvement is achieved in making oil-in-water resin emulsion pigment colors by using a dispersed pigment slurry component, containing pigments, pigment dispersing agents with or without the presence of protective colloids and water, and forming a pigmented resin emulsion in situ with an oil phase component, by emulsifying said oil phase component in the water of said pigment slurry component. The emulsifying agents may be incorporated either in the pigment dispersion component or in the oil phase component or in both. The oil phase component contains the resin binders of the pigment color compositions and may contain in addition solvents, driers and other required ingredients. According to this invention, the pigment slurry can be added under agitation slowly to the oil phase or the oil phase can be added to the pigment slurry as an alternative process.

The advantages of this process when compared to the prior art processes are as follows:

(1) Higher pigment percentages are obtainable;

(2) A smaller amount of binder can be tolerated and still give improved bonding properties to the fabric.

(3) Lowering of the crock and improving laundering resistance is obtained by enveloping the pigment particles with emulsified resin particles formed in situ in the presence of the pigment.

As binder resins the following may be mentioned as suitable: condensation products of bis-phenol and epichlorhydrin esterified with fatty acid esters, styrenated alkyds, styrenated oils, pentaerythritol esters of fatty acids, which may be advantageously precondensed with maleic anhydride, and alkyd resins treated or used as described herein, amongst others. Organic solvent soluble urea and melamine formaldehyde, resins may be present in the emulsions to further toughen the binder resins.

To prepare such emulsions, the fatty aicd esters are advantageously bodied to a relatively heavy viscosity and then emulsified. The dispersed phase of such emulsions is the fatty acid ester.

In the case of emulsion polymerization, the dispersed phase particles of such emulsions are then aggregated by employing hydrogen peroxide, or in other known ways. The degree of aggregation of the dispersed particles in situ is such as to render the emulsion highly sensitive to the action of air when spread in thin films and thereby provide for the formation of a coherent solid film immediately upon demulsification of the emulsion. Advantageously the pH value of the emulsion is retained within certain limits during the aggregation treatment. Improved results are obtained by the treated emulsions of this specification if the increase in oxygen content of the solidified fatty acid esters is kept low, when compared with the oxygen content of the same esters before emulsification and emulsion aggregation.

A further aspect of the improvement of this invention embodies a special pigment dispersion, the composition and preparation of which is described below. By this special disperson, improved color yield can be obtained.

A still further feature of the improvement of this invention is the provision of a special clear extender emulsion which further improves the color yield.

FATTY ACID ESTERS

Whereas fatty oils which are drying or semi-drying may be used in this process, providing requirements on chemical resistance of the binders is moderate, it is preferred to use esters of fatty acids which yield tougher films than drying oils. Typical of the oils, the fatty acids of which may form the esters used in this process are as follows:

Tung oil
Oiticica oil
Dehydrated castor oil
Linseed oil
Perilla oil
Sunflower oil
Poppyseed oil
Soya bean oil
Walnut oil
Rapeseed oil
Pineseed oil
Olive oil
Corn oil
Cottonseed oil
Coconut oil
Babassu oil
Hydroxylated oils such as castor oil, etc.
Fish oils (train oils), (Menhaden oil)

The following polyhydric alcohols are suitable for producing esters with the above fatty acids:

Glycerin
Pentaerythritol
Mannitol
Sorbitol
Alcohols formed by the condensation of bis-phenol and epichlorhydrin
Certain polyglycols, amongst others To form fatty acid modified alkyd resins, the following polycarboxylic acids and their anhydrides may be used:

Phthalic acid,
Maleic acid,
Succinic acid,
Malic acid,
Tartaric acid,
Fumaric acid,
Citric acid,
Adipic acid,
Sebacic acid,
Azelaic acid,
Suberic acid, etc., or anhydrides of such acids, also carbic anhydride Very excellent results can be obtained by styrenated alkyds which are copolymers of fatty acid modified alkyd resins and polystyrene. Styrenated fatty oils, such as styrenated linseed and soyabean oil, or styrenated dehydrated castor oil yield also interesting products.

Very satisfactory results have been obtained with pentaerythritol esters of fatty acids which may be advantageously precondensed with maleic anhydride. Particularly advantageous results were obtained with the condensation products of bis-phenol and epichlorhydrin, esterified with fatty acids, such as dehydrated castor oil fatty acids or mixtures of the fatty acids of soyabean oil and oiticica oil. Such esters may be further modified by styrenating them.

The above described fatty acid esters may be toughened by the addition of organic solvent soluble amine aldehyde-resins with urea or melamine or alkylated or etherified urea and melamine.

A few examples are given of commercially manufactured resins useful in the instant process: (1) Epichlorhydrin and bis-phenol condensation product (alcohol): Epon 1004, Shell Chemical Co., dehydrated castor oil fatty acid ester of Epon 1004; Epitex 120, Jones-Dabney Co., Louisville, Ky. (2) Styrenated alkyd: Styresol 4250, Reichhold Chemicals, Inc. (3) Phthalic amhydride-free styrenated alkyd: Soya fatty acid ester of carbic anhydride (bicycle 2-2-1 cycloheptane delta 5 dicarboxylic anhydride 2,3) and glycerine (co-ester of fatty acids and anhydride), styrenated, Bakelite Corporation's RJS 502, RJS 153 and RJS 155 resins. Polystyrene content 25 to 75%. (4) Pentaerythritol-glycerin mixed ester of maleic anhydride treated fatty acids: Esskel, linseed oil base, Spencer Kellogg & Sons, Inc. (5) Styrenated soyabean oil: Keltrol 60, Spencer Kellogg & Sons, Inc.

Organic solvent soluble amine-aldehyde resins: Melmac 245-8, Melmac 248-8 (American Cyanamid Company).

The polyhydric alcohols, forming the esters useful as starting materials in this process, should be preferably at least tri-hydric, such as glycerin.

I found that in my process best results are obtained with polyhydric alcohol esters of acids of fatty oils, which esters contain in their acid component at least 50% acids of fatty oils and which fatty oil acids comprise fatty acids having at least two double bonds. In this definition of fatty acid esters, there is included the group of drying and semi-drying fatty oils, further the group of synthetic oils and the group of alkyd resins, not containing more than 50% polybasic acids in their acid component.

Any appropriate mixtures or combinations of members of the above described classes may be treated, as desired.

The better drying a fatty oil is, the more suitable it is for my present process. I found that at least some of the fatty acids present in my esters should preferably contain more than one double bond in the molecule. This includes esters of the drying oil fatty acids and of the semi-drying oil fatty acids. I also found that esters of fatty acids having conjugated double bonds undergo easier my emulsion aggregation process, than fatty acids with isolated double bonds.

EMULSION AGGREGATION

The emulsion polymerization or emulsion aggregation process and its reaction conditions is described in detail in my United States Patent No. 2,530,370. The aggregating agent is oxygen. I believe that the active agent of my process is an electrically charged oxygen particle. However, I have no definite proof of that supposition. As not any and all oxygen may act in my process as aggregating agent, I shall refer to the oxygen which is suitable in my process as "active oxygen" and I believe that the particles of this active oxygen are most probably electrically charged.

I can obtain my active oxygen in various ways. (1) I may use a peroxide, such as a metal peroxide or hydrogen peroxide, or an organic peroxide to supply my active oxygen to my emulsions. (2) I may blow oxygen or an oxygen containing gas, such as air, through my emulsions. (3) I may use the oxygen which is present in the water phase of my emulsion as absorbed oxygen.

Application of heat accelerates the action of the oxygen. Usually temperatures between 50° C. and 80° C. are useful for such acceleration. Agitation of the emulsion also accelerates the process.

In case peroxides are used and oxygen is liberated in situ, further activation by agitation and/or heat is not a necessary requirement and the aggregation may be carried out in a satisfactory way at room temperature and even at temperatures lower than room temperature.

The concentration of the emulsion influences the rate of reaction. The 10% to 20% non-volatile containing emulsions will produce solidified particles faster than a 70% solid content emulsion. Very satisfactory results can be obtained around 50% non-volatile content.

*Advantageous pH limits.*—One of the important criterions of my process is the pH of the emulsion. I found that it is important to have critical pH limits to carry out my process satisfactorily. I found that the reaction is extremely slow with a pH of 7 and there is a very slow range from about a pH of 5.7 to about 8.4. The range is very active below 5.7, such as for instance in the neighborhood of pH of 2.8 and also above 8.4, for instance in the region of pH of 10.5 and higher. In other words, the reaction is greatly accelerated by the pH values below 5.7 or above 8.4. However, for many purposes, if working on the alkaline side, I found it to be advantageous to have a pH of at least 10, and if working on the acid side, to have a pH which does not exceed 4.

It has been found that metallic driers are accelerating the emulsion aggregation process particularly in such cases in which the aggregation is carried out in an alkaline medium. Therefore, if metallic driers are desired to be present in the fatty acid esters, it is of advantage to work on the alkaline side. However, if the absence of metallic driers is desired, a conversion is an emulsion on the acid side if more desirable. Further, it may be mentioned that conversion on the acid side is advantageous if a constant pH is desired. In case of emulsion aggregation on the alkaline side, the pH generally changes insofar as it gradually becomes lower.

In the illustrative examples of this specification the process will be demonstrated on emulsions which are on the alkaline side of the pH range. This is meant to illustrate the process only and not to limit same.

*Oxygen supplying agents.*—As mentioned further above, if other reaction conditions are proper, the oxygen content of the water, present in the emulsion, may be satisfactory.

Oxygen may be supplied to the emulsion in form of oxygen gas or oxygen containing gases, such as air, by bubbling through the emulsion such gases or by introducing them by known means. Ozone may also be used.

To produce oxygen in situ peroxides or other per-compounds may be used. In most of the examples, hydrogen peroxide is used to illustrate the addition of per-compounds. However, other peroxides may also be used, such as sodium peroxide, barium peroxide, magnesium peroxide, zinc peroxide, other metal peroxides, or organic peroxides, such as benzoyl peroxide, urea peroxide, etc. Examples of per-compounds are further perborates, percarbonates, persulfates, such as potassium, sodium and ammonium persulfates, perchlorates, pyrophosphate peroxides, oxonides, etc. The criterion of the usefulness of these agents is that they should supply oxygen in situ under the reaction conditions applied in my process and that the emulsion could be prepared in such a way that it should not break in their presence.

*Oxygen content.*—In my process the oxygen content of the emulsified fatty acid esters increases very little, if any, during the emulsion aggregation process. The oxygen content increase is not more than 2.8% and advantageously not more than 1½%. In most cases the oxygen content increase is less than ½%.

EMULSIFYING AGENTS

Great variety of emulsifying agents may be used in my process. A list of such emulsifying agents is given, for instance, under the title of Surface-Active Agents in the January 1943 issue of Industrial and Engineering Chemistry, on pages 126 to 130.

Soaps of fatty acids are for instance satisfactory emulsifying agents. A list of some others is given herewith:

| Trade Name and Source | Manufacturer's Description |
| --- | --- |
| Duponol ME—E. I. du Pont de Nemours & Co. | Fatty alcohol sulphate, sodium salt. |
| Aerosol OT—American Cyanamid Company. | Dioctyl ester of sodium sulphosuccinic acid. |
| Emulphor AG—General Dyestuff Corporation. | Polyethylensoxide condensation product. |
| Beta Sol—Onyx Oil & Chemical Company. | Quaternary ammonium salt. |
| Igepon—General Dyestuff Corporation. | Sodium sulphonate of an oleic acid ester of an aliphatic compound, for instance, of the type of $C_{17}H_{35}CON-(CH_3)-C_2N_4SO_2Na$. |
| Triton 720 and 770—Rohm & Haas. | Sodium salt of aryl alkyl poly ether sulphonate. |
| Emulgor A—Glyco Products. | A highly polymerized glycol ester. |

I found that from the various emulsifying agents such types are most suitable, which are active both on the acid side and on the alkaline side. The non-ionic emulsifying agents belong to that class, such as for instance, nonaethyleneglycolmonooleate, or the corresponding dioleate, or the corresponding monolaurate or dilaurate or monoricinoleate or diricinoleate (Glyco products). A further satisfactory group is the one of the cation-active emulsifying agents. Examples are the quaternary ammonium salts. As will be seen, the fatty alcohol sulphates (for instance, Duponel ME) are also suitable for my process.

PROTECTIVE COLLOIDS

In the examples of this specification casein, methylcellulose and sodium carboxymethylcellulose are mentioned as suitable protective colloids. Others which may be used are: gum tragacanth, dextrin, starch solutions, sodium acrylate, sodium methacrylate, hydroxy ethylcellulose of the water soluble and alkali soluble types, locust bean gum, water soluble salts of the maleic adduct of styrene, etc. Alginates may be used also, or albumene or soya protein.

As far as protective colloids and emulsifying agents go, care should be exercised that anionic and non-ionic agents and systems may be mixed, and cationic agents and systems may be mixed with non-ionic agents and systems, but cationic and anionic agents or systems normally cause flocculation of the emulsion or of the pigments. Ammonium caseinate, e. g. acts anionic, but it is possible to use casein in cationic systems, if it is dissolved with the aid of cationic quaternary ammonium compounds.

CATIONIC EMULSIFYING AGENTS

Satisfactory oil-in-water emulsions can be prepared with cationic agents. Most of them, however, work on the acid side only. Many times alkaline pH is of advantage for certain purposes.

The main difficulty is to find proper cationic pigment dispersion agents in water, as most of them act as flushing agents, which will drive the pigment from the water to the oil phase. Pigment flocculation occurs with such agents, should they be used with oil-in-water emulsions, particularly if they are emulsion polymerized, as the pigment is not in direct contact with the oil phase. Either the emulsion breaks or the pigment flocculates, or both.

I have found very satisfactory results with lauryl pyridinium chlorate, cetyl-dimethyl-benzyl ammonium chloride (Triton K–60, Rohm & Haas), methyl dodecyl benzyl trimethyl ammonium chloride (Nyamine 2389, Rohm & Haas Co.) amongst others.

They may be used as emulsifying agents to form oil-in-water resin emulsions and the first and last mentioned ones act as good pigment dispersing agents also.

PIGMENTS USED IN MAKING WATER DISPERSIONS

The organic pigments used herein are usually prepared by precipitation methods. They are all water insoluble. As starting material for this invention, either a filter press cake or dry powder can be used. Carbon black, if used, is not made by precipitation method and is used as dry powder in the process.

The following groups of pigments are exemplifying, but not limiting the scope of the starting materials of this invention:

(1) *Phthalocyanine pigments.*—Phthalocyanine blue, which is a copper or tin-copper phthalocyanine, is marketed under trade names of Monastral Fast Blue by E. I. du Pont de Nemours & Co. and as Heliogen Blue by General Dyestuff Corporation.

Phthalocyanine green, which is a chlorinated copper phthalocyanine color, is marketed under trade names of Monastral Fast Green, by E. I. du Pont de Nemours & Co. and as Heliogen Green by General Dyestuff Corporation.

(2) *Insoluble azo pigments.*—Benzidine yellows are couplings between dichlorobenzidine and acetoacetic arylides, such as the acetoacetic-anilide, -ortho toluidide, -xylidide, -para chloro anilide and -ortho chloro anilide.

Benzidine orange is a coupling product of dichlorobenzidine with pyrazolone substitution products, such as methyl phenyl pyrazolone.

Hansa yellows are acetoacetic arylide couplings with substituted anilines, like 4-chloro-2-nitroaniline, or orthonitraniline, amongst others.

Insoluble azo reds are coupling products of the Naphthol AS type compounds of beta-ortho-naphthoic acid, such as Naphthol AS, Naphthol AS–OL, Naphthol AS–BS, Naphthol AS–D with fast color salts, such as 2,5 dichloroaniline, p-nitro-orthotoluidine, p-nitro-orthoanisidine amongst others. One example being the coupling product of Naphthol AS–ITR with ITR fast color salt (fast red color salt ITR).

Naphthol AS type couplings may yield also yellows and oranges of the insoluble azo pigment group. Aniline black pigment can be listed here too.

Toluidine maroon and dianisidine blue and a brown pigment obtained by forming the copper salt of paranitraniline red are other examples.

(3) *Vat pigments.*—Vat pigments are of the indigoid or anthraquinone type. The indigoid type includes thioindigo derivatives and the anthraquinone type includes derivatives of flavanthrene, benzanthrone and complex structures made by condensing benzanthrone molecules.

Thioindigo Red B has Color Index No. 1207 and Schultz No. 912. For formulation, i. e. structural formula see pages 208 and 209 in Pratt: Chemistry and Physics of Organic Pigments, John Wiley & Sons, 1947.

Indanthrene Blue Color Index No. 1106, Schultz No. 837 is an example of the anthraquinone type vat pigments.

Structural formulas of some vat pigments are listed on pages 429 to 435 in volume V of Mattiello: Protective and Decorative Coatings, John Wiley & Sons, Inc., New York, 1946. They include Indanthrene Rubine RD, Indanthrene Orange RRTA, Indanthrene Golden Orange GA, Indanthrene Brown RA, Helio Fast Yellow 6GL, Indanthrene Brilliant Violet 3BA, Fast Violet 4RN, Indigo Blue, Indanthrene Navy Blue RA.

(4) *Carbon blacks.*—Furnace blacks, channel blacks, acetylene gas blacks and lampblacks can also be dispersed by the instant process.

Some of the inorganic pigments are also useful in this process and are mentioned under "Proportions of Ingredients" further below.

In the improved pigment dispersion method of this invention the following dispersing agents are preferred:

Fatty alcohol sulfates, such as sodium, ammonium or triethanolamine salts of sulfates of lauryl alcohol, cetyl alcohol, oleyl alcohol and their mixtures. These agents are known in the art to form emulsions and are used as detergents, but their use as pigment dispersing agents is believed to be novel.

Sulfates of hydroabietyl alcohol act similarly to fatty alcohol sulfates.

Examples of commercial products are Duponol ME, which is a dry powder form of sodium lauryl sulfate, manufactured by E. I. du Pont de Nemours & Co., and Duponol WA paste, which is a water paste of the same compound, containing 30% active ingredient and some inorganic salt impurities.

It was found that the action of fatty alcohol sulfates is greatly enhanced and improved by using as further additive a minor quantity of sodium alkyl naphthalene sulfonates, such as the isopropyl naphthalene sulfonate and the isobutyl naphthalene sulfonate. The former is marketed under the trade name of Nekal A by the General Dyestuff Corporation and the latter as Nekal DK by the same company.

Further improvement in degree of defloculation of the pigment is obtained, by adding protective colloids to the water dispersion, such as casein and methylcellulose.

The proportions of surface active agent to pigment content is very important. The fatty alcohol sulfates may be added in proportions of 2 to 20% per 100 parts of dry pigment, but for complete deflocculation of the pigment at least 10% and preferably 15 to 20% are used. Higher proportions of fatty alcohol sulfate are permissible, but do not seem to produce further improvement, in deflocculation, to a degree to warrant such increase. Larger proportions may be used, however, to satisfy specialty purposes of incorporation into finished products or to satisfy machinery limitations.

The sodium alkyl sulfonates are added in proportions of ½% to 4% based on the pigment content, 2% being a preferred and satisfactory proportion.

If protective colloids are added, about 1% of dry casein is used, based on the dry pigment content and about 5% methyl cellulose low viscosity type, designated as 15 cps. type in the trade. Larger quantities of protective colloids can be added, but their action is distinct in the here given proportions. They help to complete deflocculation and keep the particles in suspension.

These improved pigment dispersions are particularly advantageous in coloring latex compositions for dipping or knife coating or roller coating applications, and for use in paper beater coloring applications, also wherein increased color values are obtainable.

I have found that some pigments require larger proportions than 20% surface active agent, and the required percentage may go up as high as 40%.

A further improvement of the pigment dispersion step of this invention consists in carrying out the deflocculation of the pigment at elevated temperature which ranges from above room temperature to below the boiling point of water, as for instance 90° C.

PROPORTIONS OF INGREDIENTS

The proportions of the ingredients of the compositions of this invention may tolerate certain limits. The examples here below illustrate the process and do not necessarily limit same.

*Pigment content.*—The proportions of pigments vary depending on the type used. In addition to the pigments listed further above in this specification, some inorganic pigments are also used in pigment printing compositions (resin emulsion color concentrates), in particular, artificially prepared iron oxide pigments (yellows, reds, browns, and blacks), cadmium pigments (yellows, oranges, reds, and maroons), and white such as titanium dioxide pigments.

The pigment content of the color concentrates of this invention ranges from about 4.5% to about 20% with the organic type pigments, 8% to about 23% with the inorganic pigments, and, in case of titanium dioxide, it may go up to about 40%.

*Resin content.*—The non-volatile resin content of the color concentrate compositions of this invention ranges from about 6% to about 20.5% and, in most cases, is between the range of 7% to 13%.

Based on 1 part dry pigment, depending on the type of pigment used, the non-volatile resin content may range from about 0.25 part to about 4.5 parts.

*Protective colloid content.*—The protective colloid content of the color concentrates ranges from about 1% to about 5.5%. If casein is used as part of the protective colloid, I prefer to use it in the range of 1% to 3.5% of the composition. Low viscosity methylcellulose, such as methylcellulose 15 cps., may be advantageously used in the proportions of 0.5% to 2% of the composition.

To show the interrelationship of pigment to protective colloid, I may mention that on 1 part of pigment the total protective colloids range from about 0.05 part to about 1.5 parts. Casein, if used, may be used in the range of 0.05 part to 0.75 part for each 1 part of pigment. The low viscosity methylcellulose range is preferred to be from 0.01 part to 0.40 part for each 1 part of pigment.

The preferred range of casein is from 0.08 part to 0.20 part and for the methylcellulose low viscosity from 0.015 part to 0.060 part for each part of dry pigment. The methylcellulose proportion may go up frequently to 0.120 part for each part of dry pigment.

*Proportion of surface active agents.*—As many pigment dispersing agents may act as emulsifying agents and vice versa, the proportion of total surface active agents relating to the total quantity of the composition is being given here. The surface active agent proportion mentioned here below relates to the sum of the pigment dispersing agents and emulsifying agents. The quantity of the surface active agents in these compositions is from about 1.6% to about 4.5%, but, in the case of higher pigmented compositions like whites, it may go up as high as 7.5%. All percentages are based on the total weight of the composition.

Based on 1 part of dry pigment, the range of surface active agents is from about 0.07 part to about 1 part.

It should be understood that the portion of the surface active agents which is used to disperse the pigments is based on the pigment content and ranges normally up to 20% based on the pigment and, in some extreme cases, up to 40%, whereas the portion which acts as emulsifying agent for the resins and oil phase in general is related to the quantity of the oil phase present in the pigmented resin emulsion composition. I may mention that 2 to 6% of emulsifying agent is used in most cases for emulsifying purposes, based on the dispersed phase (oil phase) content of the pigmented resin emulsion composition.

METHOD OF PREPARATION

The basic characteristic of this invention is that the emulsification of the resin is carried out in the presence of dispersed pigments. Water dispersed pigments are used and the water phase of the emulsion consists in its entirety, or almost in its entirety, of the water content of said pigment dispersion in water. Said water content, of course, contains other water soluble ingredients such as surface active agents, protective colloids, and others.

There are basically two methods of emulsification: In the first method, the water dispersion of the pigments is placed first in the mixing equipment and the resin is slowly added while the mixture is properly agitated. This method may be called "oil phase-to-water phase" method. The second method of preparation consists of adding the water dispersed pigment to the oil phase under agitation slowly. In this second method, first a water-in-oil emulsion is formed which, at a later stage, converts to an oil-in-water emulsion. This method may be called "water phase-to-oil phase" method.

The first method usually results in lower crocking color concentrates but it requires good quality mixing equipment, preferably high speed agitation and homogenization. The second method is more adaptable with slow speed agitators and where the mixing equipment is less efficient. Proper formulation of the water phase and of the oil phase is required and the process requires care to avoid pigment flocculation during emulsification. The color concentrates so formed are advantageously further homogenized and colloid milled or passed through another suitable equipment to secure proper particle size distribution and uniformity.

Example 8 shows a few methods of emulsification.

The illustrative examples here below illustrate the process but do not limit same.

The water phase and oil phase, properly proportionated, may be fed simultaneously to a homogenizing or emulsifying equipment.

ILLUSTRATIVE EXAMPLES

The here following examples will illustrate the process and products, without limiting them. Emulsifying agents, pH of emulsions, type and percentage of protective colloids will be considered variable, within the described scope of this specification. The resins used in the illustrated examples are used for the purpose to illustrate the invention and can be replaced by other resins referred to elsewhere in this specification. The same applies to the individual pigments which are used only to illustrate the processes. With proper evaluations they can be replaced in the illustrative examples by those skilled in the art with pigments described elsewhere in this specification.

E-polyester binders

The E-polyester binders of this invention consist of an alcohol component and a fatty acid component.

*Alcohol component of E-polyesters.*—The alcohol component of the E-polyesters of this invention are resinous condensation products of epihalohydrins or dihydrins with polynuclear phenols, like $(p\text{-}HOC_6H_4)_2CMe_2$, Me being a methyl radical. The most common type of this group is represented by the condensation products of epichlorhydrin with bis-phenol. The following resinous alcohols can be prepared by such condensation:

| Resin No. | Combining Weight | Melting Point, °C. |
|---|---|---|
| 1 | 132 | 65–75 |
| 2 | 174 | 95–105 |
| 3 | 188 | 125–135 |

These products are substantially free of halogens and should be considered as ethylene oxide derivatives of polynuclear phenols, showing free hydroxy groups, which can enter into esterification reactions.

*Fatty acid component of E-polyesters.*—The fatty acid components may be fatty acids of naturally occurring fats and fatty oils. Examples are: oleic acid, linoleic acid, linolenic acid, clupanodonic acid, dehydrated ricinoleic acid, eleostearic acid, natural mixtures of soyabean fatty acids, sunflower oil fatty acids, linseed oil fatty acids, dehydrated castor oil fatty acids, tung oil fatty acids, stearic acid, palmitic acid, lauric acid, tall oil acids, etc. Rosin may be used to replace part of the fatty acids. Normally these fatty acids have 12 to 24 carbon atoms in the molecule. Unsaturated fatty acids obtained from drying and semi-drying fatty oils are preferred for this invention, as they reach the "thermo-set" stage at room temperature or at low temperatures, not exceeding 220° F. at reasonable speed. Linseed oil fatty acids and dehydrated castor oil fatty acids are examples of products with merit in this process. Rosin acids may be present to replace part of the fatty acids: e. g., linseed oil fatty acids and rosin may be combined simultaneously with the alcohol component.

*Resinous E-polyesters.*—The following examples are given for the preparation of the E-polyester binders, suitable in the instant process:

EXAMPLE 1

| | Pounds |
|---|---|
| Alcohol component resin #2, with combining weight of 174 | 1102 |
| Rosin, W. G. grade | 243 |
| Linseed oil fatty acids | 1230 |
| Petroleum aromatic solvent with boiling range from 318° to 400° F. and flash point of 100° F. | 680 |
| Mineral spirits | 681 |
| Total | 3936 |
| Loss of water of esterification | 205 |
| Yield | 3731 |

Heat to 480° F. alcohol component resin, fatty acids and rosin; hold for one hour, hold for proper viscosity when thinned, preferably pass inert gas through reaction mass, during heating; thin. The yield is 472 gallons, 7.90 lbs./gal., non-volatile content 65% acid number 12, viscosity Z—$Z_2$, Gardner scale.

EXAMPLE 2

| | Pounds |
|---|---|
| Alcohol component resin #2, with combining weight of 174 | 2540 |
| Dehydrated castor oil fatty acids | 1695 |
| Xylol | 3435 |
| Total | 7670 |
| Loss of water of esterification | 400 |
| Yield | 7270 |

Esterification reaction starts at 350 to 400° F. Raise temperature from 400° F. to 500° F. in 1½ to 2 hours, pass inert gas through reaction mixture, hold until acid number is 2. Thin. Yield is 898 gallons, non-volatile 55%, 8.10 lbs./gal., acid number 0.5 to 2, viscosity X to Z on Gardner scale. This resin is further reduced to 50% non-volatile (N. V.) with xylol for use in the examples.

Both the resin of Example 1 and that of Example 2 can be made by the solvent process of esterification in the presence of small amounts of solvent, while the solvent is refluxed and the condensed water separated before the refluxing condensed solvent is returned to the reaction mixture. Temperature curve has to be adjusted to yield the same constants of the end product.

In the resin formulations of Examples 1 and 2 the fatty acids can be replaced by other fatty acids such as soyabean fatty acids, mixtures of oiticica fatty acids and soya fatty acids, etc. Also styrenated E-polyester resins can be made by condensing polystyrene into the resin known in the art of preparation of styrenated oils and styrenated alkyd resins.

EXAMPLE 3

To a phthalocyanine green presscake, marketed under the trade name of Heliogen Green GV presscake, having 27.6% pigment content, Duponol ME dry powder was added to yield 18% Duponol on the pigment content, and Nekal A dry powder was added to yield 2% addition on the pigment content. The presscake was mixed with a spatula by hand; after five minutes it became completely liquid. It has been found, that dry powder addition, which is attractive as it does not increase water content, yields very satisfactory results. However, the premixing represents some problem and knife-pronged agitators are needed, such as pony mixer blades, to liquefy the presscake to a slurry. Propeller types, or other turbine type agitators do not work well at this stage, as they could not manage to break up the lumps of the presscake. The pre-mix is then further dispersed by the aid of an Eppenbach Homomixer, which is a high speed turbine mixer, having a narrow clearance between turbine and stator. It runs about 3,600 R. P. M. About 15 minutes is satisfactory, but occasionally up to 30 minutes may be used. A 5 H. P. motored mixer satisfactorily disperses a 500 lb. presscake quantity in a 55 to 60 gallon size drum (open head drum). The active ingredient in Duponol ME dry powder is the same as that of Duponol WA paste, i. e., technical sodium lauryl sulfate.

The homomixed slurry is passed through a colloid mill to complete dispersion and deflocculation. Pebble milling is also very satisfactory to complete pigment deflocculation and dispersion. 24 hours to 48 hours are satisfactory milling times.

Pigments which are by nature hydrophobic may be completely deflocculated as dispersions in water by incorporating sodium lauryl sulfate into a mixture of water and of the pigment, mixing the mixture and passing the slurry through a pigment dispersing equipment. For example, in this process, based on 100 parts of dry pigment, about 4% to about 20% sodium lauryl sulfate and, if desired, about ½% to about 2% short chain substituted alkyl naphthalene sulfonate, are mixed into the mixture of water and pigment. Generally speaking, the dispersion thus obtained preferably comprises a water-and-pigment mixture component and a dispersing agent component, wherein the water-pigment mixture component comprises about 14% to about 35% by weight of hydrophobic organic pigment and about 65% to about 86% by weight of water. The dispersing agent component comprises a water soluble fatty alcohol sulfate, for example, a sulfate of lauryl alcohol, cetyl alcohol, or oleyl alcohol. The dispersing agent component is preferably in solution in the water and the pigment is in direct contact with the solution. In the event artificially precipitated pigments are dispersed, the water-and-pigment mixture component may be a presscake collected in the filter presses. Examples of suitable pigments are: phthalocyanine pigments, such as copper phthalocyanine, insoluble azo pigments, vat pigments, and carbon black.

If desired a protective colloid may be incorporated in the dispersion. If casein is used, it may be present in the proportion of ½% to 50% based upon the weight of the dry pigment. If the protective colloid is methyl cellulose, it may be present in the proportion of 1% to 10% of the weight of the dry pigment. The dispersion may also be obtained by ball milling, pebble milling, or roller milling.

EXAMPLE 4.—A SCHEMATIC EXAMPLE OF PIGMENT DISPERSION IN WATER

| | Parts by weight |
|---|---|
| Pigment (Phthalocyanine Blue, dry basis) | 16.817 |
| Water | 66.937 |
| Duponol ME | 3.027 |
| Nekal A | 0.336 |
| Casein Duponol solution [1] | 1.488 |
| Dry methylcellulose, 15 cps | 0.841 |
| Antifoam | 0.420 |
| Mineral spirits (#46 Mineral Spirits Amsco) | 4.204 |
| 18% casein solution [2] | 5.930 |
| | 100.000 |

[1] Casein Duponol solution:

| | Parts by weight |
|---|---|
| Water | 75.86 |
| Protovac 8397 (ammonium caseinate, The Borden Company) | 11.39 |
| Dowicide A (sodium O-phenylphenate, The Dow Chemical Co.) | 0.11 |
| Dowicide G (sodium pentachlorophenate, The Dow Chemical Co.) | 0.11 |
| Ammonia | 0.17 |
| Duponol WAQ | 12.33 |
| Antifoam | 0.03 |
| | 100.00 |

[2] 18% casein solution:

| | |
|---|---|
| Protovac 8397 | 18.00 |
| Water | 79.39 |
| Dowicide A | .18 |
| Dowicide G | .18 |
| Ammonia | 1.50 |
| Sequestrene ST [3] | .75 |
| | 100.00 |

[3] Sequestrene ST: 80% active ethylene diamine tetra acetic acid, sodium salt; Alrose Chemical Company.

EXAMPLES 5, 6, 7, AND 8.—SCHEMATIC EXAMPLES OF METHOD OF PREPARATION

In Examples 5 to 8 the following resin mixture was made to form the oil phase:

| | Parts by weight |
|---|---|
| Resin 50% non-volatile content in xylol (such as resin of Example 2) | 88.8 |
| Butyl modified melamine resin (such as Melmac 245–8 of American Cyanamid Co.) 50% non-volatile (30% butyl alcohol and 20% xylol) | 9.8 |
| Drier mixture [1] | 1.4 |
| | 100.0 |

[1] Drier mixture:

| | Parts by weight |
|---|---|
| Lead naphthenate drier, 24% metal content | 64.00 |
| Cobalt naphthenate drier, 6% metal content | 15.30 |
| Zinc naphthenate drier, 8% metal content | 20.70 |
| | 100.00 |

|  | Example 5 | Example 6 | Example 7 | Example 8 |
|---|---|---|---|---|
| Phthalocyanine Blue Slurry of Example 4 | 76.50 | 79.51 | 77.62 | 80.76 |
| Acrawax C Water Dispersion (a polyamide dispersion in water made by Glyco Products Co., Inc.) | .23 | .23 | .23 | .23 |
| Resin Mixture (Oil Phase) | 14.79 | 15.38 | 15.02 | 15.61 |
| 18% Casein Solution (described in Example 4) | 2.81 | 2.92 | 2.85 | 2.96 |
| 10% Duponol Solution | 4.21 | (dry) .44 | 4.28 | (dry) .44 |
| 50% Slurry of Methylcellulose 15 cps. (low viscosity) in Mineral Spirits | 1.46 | 1.52 | -------- | -------- |
|  | 100.00 | 100.00 | 100.00 | 100.00 |

EXAMPLE 5.—PREPARATION

Mix under enclosed turbine high speed agitator like the Eppenbach homomixer the water phase and methylcellulose slurry; add the resin mixture (oil phase) slowly under continuous agitation. The resulting color concentrate has approximately 12.86% pigment content.

EXAMPLE 6.—PREPARATION

After premixing the water phase, add the 50% slurry of methylcellulose 15 cps. (low viscosity) in mineral spirits and then the resin mixture (oil phase). In this example note that Duponol ME dry was used. The resulting color concentrate has approximately 13.3% pigment content.

EXAMPLE 7.—PREPARATION

Incorporate with the resin mixture (oil phase) under an enclosed turbine mixer the 10% Duponol water solution ME. To this oil phase which contains the Duponol solution dispersed therein, add a mixture of the blue slurry, Acrawax C and 18% casein solution in increments under thorough agitation using an enclosed turbine mixer. The resulting color concentrate has approximately 13.05% pigment content.

EXAMPLE 8.—PREPARATION

Prepare in the mixing vessel the oil phase, add under agitation the dry Duponol to disperse the latter in the former and add to this oil phase a premixed mixture of the blue slurry, Acrawax C dispersion and the 18% casein solution in increments under thorough agitation using an enclosed turbine mixer. The resulting color concentrate has approximately 13.58% pigment content.

In Examples 5 and 6 the oil phase is added to the water phase; in Examples 7 and 8 the water phase is added to the oil phase. In Examples 6 and 8 dry Duponol is used; whereas Examples 5 and 7 use Duponol solution in water.

Resins suitable for the schematic formula are:

(1) Epitex 120, bis-phenol epichlorhydrin condensation product esterified with dehydrated castor oil fatty acids (Jones-Debney Co.). Suitable similar resins can be made by esterifying the condensate (like Epon 1004, Shell Chemical Co.) with a mixture of 90% soyabean oil fatty acids and 10% oiticica oil fatty acids, or with a mixture of 85% soyabean oil fatty acids and 15% oiticica oil fatty acids.

(2) Styrosol 4250, styrenated fatty acid modified phthalic alkyd, Reichhold Chemicals, Inc.

(3) RJS 502, phthalic anhydride-free styrenated alkyds, soya fatty acid; (4) RJS 153, esters of carbic anhydride. Polystyrene content 25 to 75%; (5) RJS 155, Bakelite Corp., reduced to 50% non-volatile.

(6) Esskol, Pentaerythritol-glycerin mixed ester of maleic anhydride treated linseed oil fatty acids. Bodied to pass the ammonia test, about 1 hr. between 450–520° F., diluted with solvents to 50% non-volatile, Spencer Kellogg and Sons, Inc.

(7) Keltrol 60, styrenated soyabean oil, diluted to 50% N. V., Spencer Kellogg and Sons, Inc.

(8) Oil modified phthalic anhydride glycerin alkyd resin with 50–55% oil content, 50% N. V., various suppliers.

Solvents used in the above resins are aromatic and/or aliphatic hydrocarbons. 10 to 20% of resin solution in the schematic example may be replaced with amine-aldehyde resins, which contain 50% N. V. in solvent mixture of alcohols and hydrocarbons, e. g.:

Melmac 245-8, butyl modified melamine formaldehyde resin, American Cyanamid Co.

Melmac 248-8, butyl modified melamine formaldehyde resin, American Cyanamid Co.

Uformite MM55 butyl modified melamine formaldehyde resin, Rohm & Haas Co.

Uformite MX61 alkyl modified triazine resin, Rohm & Haas Co.

Uformite F240 alkyl modified urea formaldehyde resin, Rohm & Haas Co.

Beetle 216–8 alkyl modified urea formaldehyde resin, American Cyanamid Co.

Other pigments and other resins may replace in these schematic formulas the ones used herein.

EXAMPLE 9

The product of Example 5 can be emulsion polymerized by adjusting the pH of the product with ammonia to be between 10 and 11 and adding two parts of a 30 volume percent hydrogen peroxide solution to the preparation under slow speed agitation and in increments. The addition of the hydrogen peroxide may be carried out during a two to twelve hour period. A lower concentrated peroxide solution in water could also be added, and faster rates used.

EXAMPLE 10

Example 5 is repeated with the change that in the resin mixture (oil phase) the melamine resin is replaced by the E-polyester binder solution used in Example 5. This example demonstrates a product which contains only E-polyester resin as binder.

Examples 11 to 14 show the preparation of clear extender print pastes suitable to adjust the color strength of the color concentrates of this invention. The color concentrates and the extender print pastes can be mixed in various proportions to yield cuts of varying color strength. Cuts from 1 to 1 up to 1 to 200 are normally used.

EXAMPLE 11

5.90 parts of the emulsion of Example 3 of my co-pending application #180,700, 47.05 parts of water are mixed and homogenized. Under agitation with a suitable mixer, like the Eppenbach homomixer, 100 parts of mineral spirits are stirred into the former emulsion in increments. The mineral spirits used in this example have a bulking value of 0.1515 gallon per pound, a flash point of 100° F., a Kauri-Butanol value of 44 to 46, and is marketed by the American Mineral Spirits Company under the trade name of Amsco Mineral Spirits #46.

EXAMPLE 12

To make an extender print paste similar to Example 11, but where the volumetric relation of solvent to water phase is changed to yield a lower solvent percentage: 23.563 parts of a 3% methylcellulose solution in water, using 4000 cps. methylcellulose, 23.563 parts of water and 2.874 parts of concentrated resin emulsion of Example 3 (Serial No. 180,700) are mixed and 45.710 parts of mineral spirits of Example 11 are incorporated in a manner as described in Example 11. The resulting emulsion has a somewhat lower viscosity than the product of Example 11. This extender emulsion has about 0.739% methylcellulose, 48.499% water, 47.759% of solvent and 3.003% reinforcing concentrated resin emulsion.

EXAMPLE 13.—RESIN-FREE EXTENDER PASTE 0.750 part of 4000 cps. high viscosity methylcellulose is dissolved in 49.250 parts of water. 50 parts of mineral spirits of Example 11 is incorporated in increments, under proper agitation. A viscous print paste is obtained.

EXAMPLE 14.—EXTENDER PRINT PASTE OF EXAMPLE 11, WHERE ONE-HALF OF METHYLCELLULOSE IS REPLACED BY WATER 0.353 part of 4000 cps. high viscosity methylcellulose is dissolved in 46.773 parts of water, yielding an 0.75% methylcellulose solution. This is mixed with a concentrated oil-in-water resin emulsion of Example 3, taking 2.874 parts of the latter. The resulting product is agitated and 50 parts of mineral spirits of Example 11 are incorporated in increments under proper agitation. On account of the 50% lower content in high viscosity methylcellulose, the water phase and consequently the emulsion has lower viscosity. The product is a fluid viscous emulsion with good printing qualities.

Other formulations having various relationships of ingredients may be used for the extenders. In the following table, proportions by weight are shown of the various ingredients, assuming the water content to be 100 parts. In these examples where reinforcing resin emulsions may be used, those resin emulsions were not considered in the computation and the ensuing analysis is based on the residual part:

| Solvent | High Viscosity Cellulose Ether | Other Ingredients |
|---|---|---|
| 107.712 | 1.523 | |
| 62.694 | 0.887 | |
| 98.476 | 1.524 | |
| 101.523 | 1.523 | |
| 84.388 | 1.266 | 0.938 Duponol ME. |
| 83.604 | 1.254 | 0.929 Duponol ME. |
| 92.813 | 1.524 | |
| 100.756 | 0.756 | |
| 83.291 | 1.249 | 0.925 Duponol ME and 1.426 Aerotex M-3 dry. |
| 82.655 | 1.240 | 0.918 Duponol ME and 4.545 Aerotex M-3 dry. |
| 106.900 | 0.754 | |
| 107.304 | 1.138 | |
| 104.480 | 1.477 | |
| 103.713 | 0.732 | |
| 103.092 | 1.522 | |
| 89.744 | 1.522 | |
| 80.569 | 1.246 | 0.562 Duponol ME. |
| 76.740 | 1.260 | 0.536 Duponol ME. |
| 87.418 | 1.236 | 0.583 Duponol ME. |
| 53.122 | 0.750 | 0.482 Duponol ME. |
| 97.944 | 1.469 | 0.392 Duponol ME. |

EXAMPLE 15.—MISCELLANEOUS EXTENDER PRINT PASTES SUITABLE IN THIS PROCESS

I have found that many of the color concentrates of this invention require higher viscosity extender print pastes in printing application, than the color concentrates of my co-pending applications, Serial Nos. 91,009 and 196,724. Such extender print pastes can be prepared by increasing the methylcellulose content and/or increasing the solvent content of the extender print pastes. My co-pending application, Serial No. 352,959, concurrently filed with this application describes such extenders in Examples 11 to 14 of that specification. Solvent contents as high as 66% by weight may be used in extender print pastes.

EXAMPLE 16.—SCHEMATIC FORMULA FOR COLOR CONCENTRATES WITH HIGH RESIN CONTENT

|  | Parts |
|---|---|
| Phthalocyanine blue slurry of Example 4 | 58.27 |
| Resin mixture (oil phase) of Examples 5 to 8 | 28.57 |
| Duponol WAQ | 2.71 |
| 18% casein solution of Example 4 | 10.45 |
|  | 100.00 |

Add the casein solution to the blue slurry, add the Duponol WAQ, and mix these 3 ingredients. Incorporate the resin mixture by adding it slowly in increments to the water phase under constant agitation, using an enclosed turbine type high speed agitator. Pass the product through a colloid mill. The resulting product has approximately 9.8% pigment content and much higher resin content per pound of dry pigment than the products of Examples 5 to 8. Other pigments mentioned in this specification or other resins may be substituted for the ones used in this example.

EXAMPLE 17.—SCHEMATIC FORMULA WITH VARIOUS PIGMENTS

In this example a number of pigments are shown in color concentrate formulations. All pigments have been first converted to a water dispersion by incorporating the following additives in the given proportions to their pigment-water mixtures, such as, for instance, to commercially available presscakes.

| Ingredient | Amount To Be Added |
|---|---|
| Duponol ME | 18.00% of Pigment Content. |
| Nekal A | 2.00% of Pigment Content. |
| Casein-Duponol Solution of Example 4 | 8.85% of Pigment Content. |
| 50% Methylcellulose 15 cps. Slurry in Mineral Spirits of Example 4. | 10.00% of Pigment Content. |
| 18% Casein Solution of Example 4 | 35.00 to 41.00% of Pigment Content. |
| Mineral Spirits | 20.00% of Pigment Content. |
| Antifoam | as required. |

In making resin emulsion color concentrates from these pigment slurries, additional emulsifying agent was added to the water phase in the proportion of about 6% on resin solids, using additional 15 cps. methylcellulose and casein as protective colloid additions. Pigment contents and resin contents of the color concentrates are given in the following table:

| Example No.: | | Pigment Content in 100 Parts of Color Concentrate | Resin Solids Content in 100 Parts of Color Concentrate |
|---|---|---|---|
| | | Parts | Parts |
| 17-A | Phthalocyanine Green | 15.6 | 10.2 |
| 17-B | Benzidine Yellow | 12.5 | 8.5 |
| 17-C | Thioindigo Brown | 8.6 | 10.4 |
| 17-D | Thioindigo Maroon | 11.8 | 8.5 |
| 17-E | Dianisidine Blue | 12.3 | 7.6 |
| 17-F | Iron Oxide Yellow (Artificial) | 20.8 | 10.4 |
| 17-G | Iron Oxide Brown (Artificial) | 20.8 | 10.4 |
| 17-H | Furnace Carbon Black | 10.4 | 10.5 |
| 17-I | Titanium Dioxide White | 38.7 | 12.5 |

The method used was the "oil phase-to-water phase" method (see Example 6). The surface active agents in these compositions range from 2.1% to 7%, the dry casein content from 1.2% to 2.7%, the dry methylcellulose content from 0.6% to 2.1%. All percentages are based on the total weight of the color concentrates.

I claim:

1. The process of preparing oil-in-water pigmented resin emulsion color concentrates with as high as up to 20% pigment content in the case of organic pigments and up to 40% pigment content in the case of inorganic pigments and being suitable for textile printing and dyeing in which in the first step a pigment slurry component is prepared which comprises a deflocculated pigment, water, and a pigment dispersing agent comprising a fatty alcohol sulfate, incorporating an emulsifying agent in said pigment slurry component, and in a step subsequent to the preparation of said initial pigment slurry emulsifying the resin in the pigment slurry component, thereby forming a resin emulsion in water in the presence of the deflocculated pigment in situ, said resin comprising polyesters containing esterified polyunsaturated fatty acid esters.

2. The process of claim 1, in which protective colloids are present in the pigment slurry during emulsification.

3. The process of claim 1, in which the emulsification is carried out in a manner that the resin phase is added to the pigment containing water phase in increments under thorough agitation.

4. The process of claim 1, in which the emulsification is carried out in a manner that the water phase is added to the resin phase in increments under thorough agitation.

5. The process of claim 1, in which the emulsification is carried out in a manner that the water phase and oil phase (resin phase) are simultaneously fed into an emulsifying and homogenizing equipment, using proper proportioning equipment for feeding.

6. The process of claim 1, in which the resin phase contains emulsifying agents properly dispersed therein prior to the emulsification step.

7. The process of claim 1, in which a fatty alcohol sulfate is used as pigment dispersing and emulsifying agent.

8. The process of claim 1, followed by the subsequent step of emulsion-polymerizing the resin component of the color concentrate.

9. The process of claim 1 characterized in that the amount of pigment is at least 10.86% based upon the weight of the pigment slurry component at the stage at which the emulsifying step of the process starts.

10. The product of the process of claim 1, in which the pigment content ranges from about 4½% to about 40%, the resin content ranges from about 6% to about 20.5%, a protective colloid is present and ranges from about 1% to about 5.5% and the combined total weight of pigment dispersing agent and emulsifying agent ranges from about 1.6% to about 7.5%, said percents being by weight and being based on the total weight of the product.

11. The product of claim 10, in which the resin is an ester of polyunsaturated fatty acids formed with the alcoholic product obtained by condensation of epichlorohydrin and bis-phenol.

12. The product of claim 10, in which the resin is a styrenated alkyd resin comprising polyunsaturated fatty acids in the acid component.

13. The product of claim 10, in which the resin is a styrenated fatty oil, said fatty oil being at least semidrying.

14. The product of claim 10, in which the resin comprises pentaerythritol-glycerin mixed esters of maleic anhydride treated fatty acids, which are polyunsaturated.

15. The product of claim 10, in which the resin comprises a polyunsaturated fatty acid modified alkyd resin.

16. The product of claim 10, in which the resin comprises an aminoaldehyde resin, alkyl modified, to the extent of 10% to 20% of the resin solids content.

17. The product of claim 10, in which the resin comprises a butyl modified melamine formaldehyde resin to the extent of 10% to 20% of the resin solids.

18. The product of claim 10, in which the pigment is a phthalocyanine pigment.

19. The product of claim 10, in which the pigment is an insoluble azo pigment.

20. The product of claim 10, in which the pigment is a vat pigment.

21. The product of claim 10, in which the pigment is a carbon black.

22. The product of claim 10, in which the pigment is an artificially prepared inorganic pigment and is a member of the class selected from iron oxide pigments, cadmium pigments and titanium dioxide pigments.

23. The product of claim 10 in which the pigment is an organic pigment.

24. The product of claim 10 in which the resin is in an emulsion-polymerized state.

References Cited in the file of this patent

UNITED STATES PATENTS

| | | |
|---|---|---|
| 2,342,581 | Hoffmann | Feb. 22, 1944 |
| 2,342,642 | Cassel | Feb. 29, 1944 |
| 2,494,810 | Hobday et al. | Jan. 17, 1950 |
| 2,637,711 | Auer | May 5, 1953 |
| 2,681,322 | Auer | June 15, 1954 |